(12) United States Patent
Perraud et al.

(10) Patent No.: US 8,467,323 B2
(45) Date of Patent: Jun. 18, 2013

(54) METHOD IN A COMMUNICATION DEVICE PROVIDING DATA SERVICES OVER A PACKET ACCESS RADIO INTERFACE AND A COMMUNICATION DEVICE

(75) Inventors: Eric Perraud, Plaisance du touch (FR); Padmaja Putcha, Gurnee, IL (US)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 12/849,320

(22) Filed: Aug. 3, 2010

(65) Prior Publication Data
US 2011/0044185 A1    Feb. 24, 2011

(30) Foreign Application Priority Data
Aug. 18, 2009   (EP) ................................... 09290633

(51) Int. Cl.
*H04B 7/00*   (2006.01)

(52) U.S. Cl.
USPC .......................................... 370/310

(58) Field of Classification Search
USPC ................................ 370/310–350
See application file for complete search history.

(56) References Cited

U.S. PATENT DOCUMENTS

| 8,233,877 B2 * | 7/2012 | Huan ......................... 455/343.3 |
| 2003/0086396 A1 | 5/2003 | Gurski et al. |
| 2008/0059859 A1 | 3/2008 | Marinier et al. |
| 2008/0107056 A1 * | 5/2008 | Choi et al. ..................... 370/311 |
| 2009/0154417 A1 * | 6/2009 | Wu et al. ....................... 370/329 |
| 2009/0258664 A1 * | 10/2009 | Huan ............................ 455/522 |

FOREIGN PATENT DOCUMENTS

EP    1150462 B1    5/2003

OTHER PUBLICATIONS

European Patent Office, "Communication", Nov. 2, 2009, European Pat. Appln. No. 09290633.8, 6 pages, Munich, Germany.

* cited by examiner

*Primary Examiner* — Fan Ng
(74) *Attorney, Agent, or Firm* — Schwabe, Williamson & Wyatt, P.C.

(57) ABSTRACT

A method in a communication device (200) providing data services over a packet access radio interface comprises monitoring (400) a control channel for signalling messages for data packets for the communication device, receiving data packets for a data service of a first type with a first periodicity and receiving (402) data packets for the data service of a second type with a second periodicity, the second periodicity being greater than the first periodicity. The method further comprises selecting (404) to not monitor the control channel for signalling messages for a period of time in response to detecting a data packet of the second type received by the communication device. A communication device is also described.

12 Claims, 4 Drawing Sheets

METHOD IN A COMMUNICATION DEVICE PROVIDING DATA SERVICES OVER A PACKET ACCESS RADIO INTERFACE AND A COMMUNICATION DEVICE

FIELD OF THE DISCLOSURE

This disclosure relates to a method in a communication device providing data services over a packet access radio interface and a communication device.

BACKGROUND OF THE DISCLOSURE

3rd generation (3G) systems, such as the Universal Mobile Telecommunication System (UMTS) have been developed and deployed to further enhance the communication services provided to mobile users compared to those communication services provided by the 2nd generation (2G) communication system known as the Global System for Mobile communication (GSM).

High Speed Downlink Packet Access (HSDPA) and High Speed Uplink Packet Access (HSUPA) have been developed to optimise UMTS with increased data rate and capacity for packet data services in downlink and uplink, respectively. HSDPA and HSUPA are referred together as High Speed Packet Access (HSPA). Standards for HSPA have been established within the Third Generation Partnership Project (3GPP): HSDPA was introduced as a release 5 feature in 3GPP and HSUPA was introduced in release 6. Within 3GPP release 7, further improvements to HSPA have been specified in the context of HSPA+ or HSPA evolution.

As is well known, cellular communication systems, such as UMTS, provide communication to mobile devices via a plurality of cells, with each cell served by one or more base stations. The base stations are interconnected by a radio network controller which can communicate data between the base stations. A mobile device communicates via a radio communication link with a base station of the cell within which the mobile station is situated. In UMTS, the base stations which are part of the UTRAN are known as Node Bs and a mobile device is known as User Equipment (UE).

3GPP release 7 introduced Continuous Packet Connectivity (CPC) which is aimed at providing improved user experience. For example, CPC allows a UE to stay connected over longer periods and so avoids frequent connection termination and re-establishment, even though the UE may only occasionally have active periods of data transmission, but which has features to reduce the uplink and downlink control channel overhead. These features include Uplink Discontinuous Transmission (DTX) for reducing uplink control channel overhead and Downlink Discontinuous Reception (DRX) for reducing downlink control channel overhead.

Release 7 (and release 8) also introduced Circuit Switched (CS) voice services over HSPA so as to improve the system capacity for voice and data services using the improvements provided by the HSPA radio interface while still employing the current voice core networks. The voice traffic is carried over the HSPA radio channels but the voice traffic is not carried over an IP backbone. In order to implement CS over HSPA, minor changes are required to the UTRAN and the UE, which may be implemented through software upgrades.

One of the requirements for the network to configure the UE with DTX/DRX parameters for CPC is the capability of the UE to support high speed channels both in the uplink and downlink. In the case of CS over HSPA, the voice call is carried by HSDPA and HSUPA packets allowing DTX/DRX modes to be used in the UE to reduce RF activity.

The network configures the UE with DTX/DRX parameters which allow the UE to enter the DTX and DRX modes and which define the patterns or cycles of the DTX and DRX modes.

There are several parameters associated with the DRX mode including the DRX cycle parameter and the 'Inactivity Threshold for DRX' parameter. The DRX cycle parameter defines the cycle or pattern of the normal DRX mode and indicates the subframe of the High Speed Shared Control Channel (HS-SCCH) the UE is required to monitor for possible downlink data allocations. For example, if the DRX cycle parameter is 5, the UE only monitors the HS-SCCH on every $5^{th}$ subframe. By limiting the number of subframes to be monitored by the UE, the battery consumption of the UE can be reduced. The 'Inactivity Threshold for DRX' parameter indicates the number of subframes of the High Speed Shared Control Channel (HS-SCCH) the UE is required to monitor following reception of a data packet. If there is no data scheduled for the UE in this period, as determined from monitoring the HS-SCCH, the UE enters DRX mode and follows the pattern or cycle of the normal DRX mode (which is defined by DRX cycle parameter). When the UE is scheduled a packet during a DRX cycle while monitoring HS-SCCH, it continues to monitor HS-SCCH again for 'Inactivity Threshold for DRX' subframes before entering the normal DRX mode.

In a voice call, when one person is talking, the other user is typically listening which means that the UE of the user talking typically receives Silence Insertion Descriptor (SID) packets from the UE of the 'listening' user. Upon reception of a SID packet, the UE, based on the above procedure for CPC, is required to monitor HS-SCCH for 'Inactivity Threshold for DRX' subframes irrespective of what other services the UE is receiving or is involved in. This may cause unnecessary current drain in the UE. Since voice continues to be a primary application for mobile telephony, this can cause quite a significant drain in battery of the UE.

BRIEF DESCRIPTION OF THE DRAWINGS

A method in a communication device providing data services over a packet access radio interface and a communication device in accordance with the disclosure will now be described, by way of example only, with reference to the accompanying drawings in which.

DETAILED DESCRIPTION OF THE DRAWINGS

Figure 1:
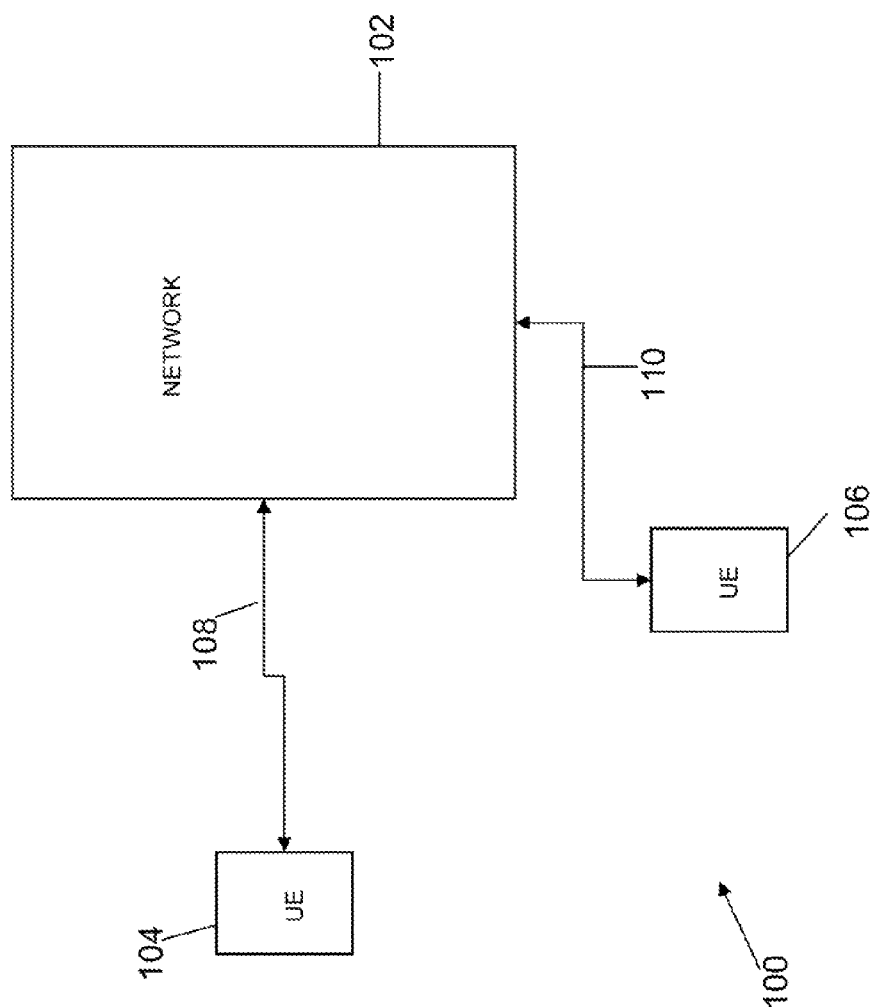
FIG. 1 is a block schematic diagram of a communication system in accordance with an example embodiment of the present disclosure.

Briefly, an embodiment of the disclosure provides a method in a communication device providing data services over a packet access radio interface, such as a HSPA radio interface. The method comprises monitoring a control channel, such as a HS-SCCH control channel, for signalling messages for data packets for the communication device. The method further comprises receiving data packets for a data service of a first type with a first periodicity, and receiving data packets for the data service of a second type with a second periodicity, the second periodicity being greater than the first periodicity, and selecting to not monitor the control channel for signalling messages for a period of time in response to detecting a data packet of the second type received by the communication device.

The term data service as used herein is intended to cover data services provided by a communication device which allow for the communication device on detecting a received data packet to determine that a next data packet will not be received in the near future. In other words, the communication device can determine that a next data packet will not be received within a period of time which, at a minimum, is long enough to enable the communication device to enter a DRX/DTX mode. Such data services include services having predictable traffic activity which is a-priori known to have a relatively long time or periodicity between successive transmissions of data packets, and services which transmit data packets from which the receiving communication device can determine that the next transmissions will not be received within a period of time which is long enough to enable the communication device to enter a DRX/DTX mode, such as Silence Insertion Descriptor (SID) packets for voice services.

In the case of voice services, Silence Insertion Descriptor (SID) packets are sent to the transmitting or 'talking' communication device. Thus, the data packets of the first type include voice packets and the data packets of the second type include SID packets. The periodicity of the SID packets may be, for example, 160 ms and is greater than the periodicity of the voice packets. On detecting a SID packet, the 'talking' communication device can determine that there is a relatively long time (typically 160 ms) before the next SID packet is to be received.

In each case, the relatively long time between successive transmissions of data packets is sufficient to enable the communication device to not monitor the control channel for the period defined by the 'Inactivity Threshold for DRX' parameter.

The disclosure will however be described in the following in relation to CS voice services over HSPA for illustrative purposes and it is not intended to limit the disclosure to CS voice services over HSPA. For example, the data services may be any IP or CS service over a packet radio interface.

The communication device may be a portable or handheld or mobile telephone, a Personal Digital Assistant (PDA), a portable computer, portable television and/or similar mobile device or other similar communication device. In the following description, the communication device will be referred to generally as a UE for illustrative purposes and it is not intended to limit the disclosure to any particular type of communication device.

Referring now to FIG. 1, a communication system 100 in accordance with an example of an embodiment of the disclosure comprises a communication network 102 and a plurality of UEs 104, 106, only two of which are shown.

The network 102 comprises a plurality of base stations (not shown) communicatively coupled to a core network (not shown) via at least one Radio Access Network (RAN) (not shown) as is well known in the art.

The UEs 104, 106 communicate with the network 102 via radio communication links 108, 110 between the UE and base stations (not shown).

Figure 2:
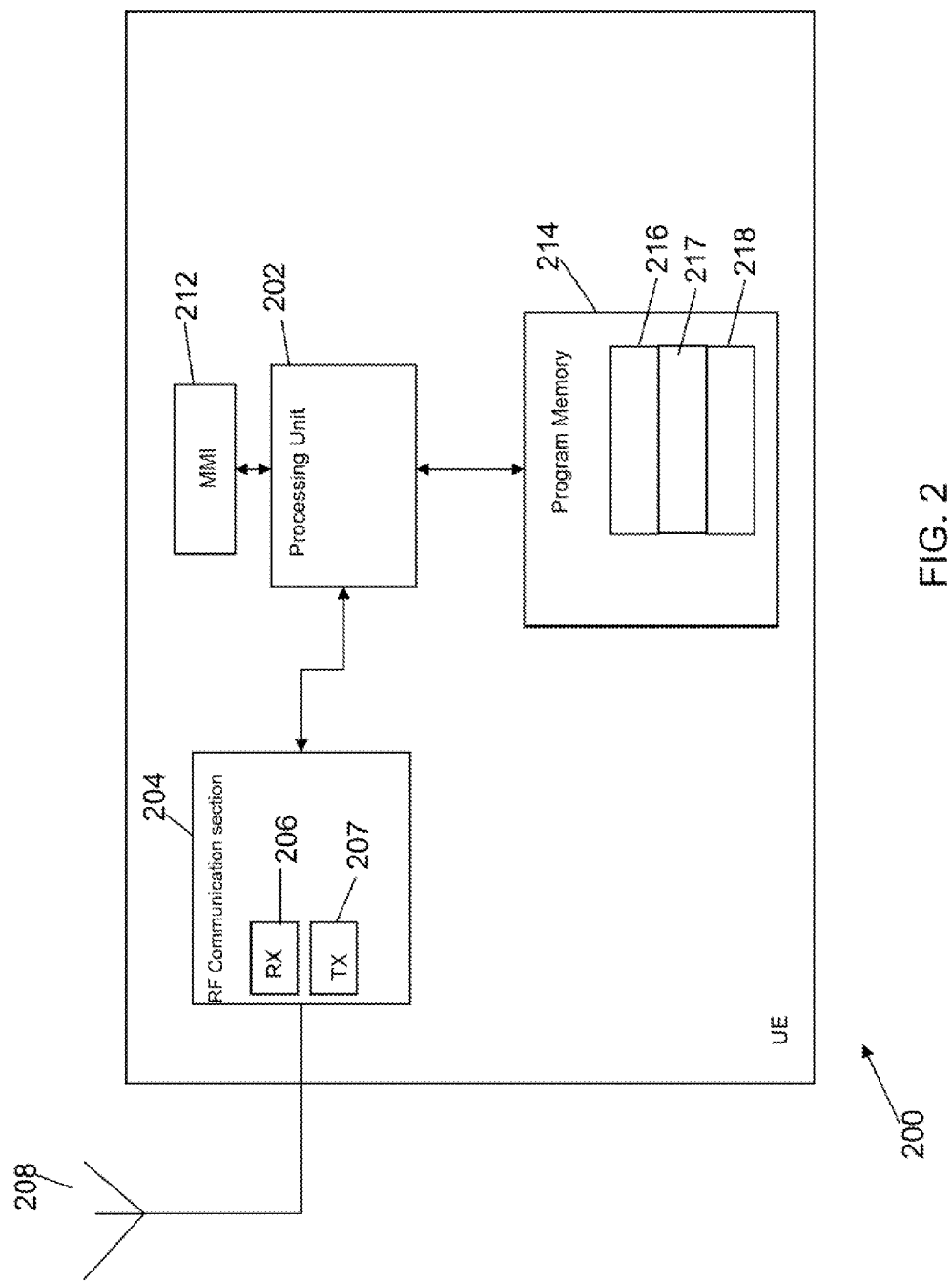
FIG. 2 is a block schematic diagram of a communication device in accordance with an example embodiment of the present disclosure.

FIG. 2 is a block schematic diagram of a communication device 200, such as the UE 104 or 106 shown in FIG. 1, in accordance with an embodiment of the disclosure. In the following description, reference is made to a communication device comprising a UE. As will be apparent to a skilled person, FIG. 2 shows only the main functional components of an exemplary UE 200 that are necessary for an understanding of the invention.

The UE 200 comprises a processing unit 202 for carrying out operational processing for the UE 200. The UE 200 also has a RF communication section 204 for providing wireless communication via a radio communication link with the network 102 of FIG. 1. The RF communication section 204 typically includes an antenna 208, a receiving section 206, and a transmitting section 207. Although not shown in FIG. 2 but as is well known, the receiving section 206 typically includes elements such as a receiver, demodulator, decoder and the transmitting section 207 typically includes elements such as a transmitter, modulator, coder. The RF communication section 204 is coupled to the processing unit 202.

The UE 200 also has a Man Machine Interface MMI 212, including elements such as a key pad, microphone, speaker, display screen, for providing an interface between the UE and the user of the UE. The MMI 212 is also coupled to the processing unit 202.

The processing unit 202 may be a single processor or may comprise two or more processors carrying out all processing required for the operation of the UE 200. The number of processors and the allocation of processing functions to the processing unit is a matter of design choice for a skilled person. The UE 200 also has a program memory 214 in which is stored programs containing processor instructions for operation of the UE 200. The programs may contain a number of different program elements or sub-routines containing processor instructions for a variety of different tasks, for example, for: communicating with the user via the MMI 212; processing data received at the receiving section 206, such as signalling information or signalling messages received from the network 102 (e.g. paging signals, coding and timing information) and traffic data (e.g. voice data); and processing data (such as voice data input at the MMI 212) for transmission by the transmitting section 207. Specific program elements stored in program memory 214 include a signalling monitoring element 216 for monitoring signalling or signalling messages on a control channel, a signalling processing element 218 and a packet detector element 217 for detecting a data packet, such as a SID packet. The operation of the signalling monitoring element 216, the signalling processing element 218 and the packet detector element 217 will be described in more detail below. The packet detector element 217 may reside in the Packet Data Convergence Protocol (PDCP) layer or in the Medium Access Control (MAC) layer or in the Radio Link Control (RLC) layer.

The UE 200 may communicate with the network 102 via radio communication links or radio channels or radio bearers provided by a HSPA radio interface. These links provide by the HSPA radio interface include a High Speed-Downlink Shared Channel (HS-DSCH) and a high speed-shared control channel (HS-SCCH) which is a downlink physical channel used to carry downlink signalling messages related to the HS-DSCH transmissions. Uplink channels are also provided. For a 3GPP release 7 or 8 UE, the UE 200 may provide CS voice services over the HSPA radio interface with CPC, in which case the UE 200 may enter DRX or DTX modes in order to reduce the uplink and downlink control channel overhead whilst providing CS voice services. For example, by enabling the UE 200 to enter a DRX mode, it allows the UE 200 to stop monitoring a control channel (such as HS-SCCH) continuously for signalling messages in order to watch out for possible downlink data allocations and to monitor the control channel according to DRX cycles or a DRX pattern defined by DRX parameters.

The network 102 provides configuration information for DRX parameters to the UE 200 such as the DRX cycle parameter and the Inactivity Threshold for DRX parameter. The DRX cycle parameter defines the cycle or pattern of the normal DRX mode and indicates the subframe of the HS-SCCH the UE is required to monitor for signalling messages for possible downlink data allocations. In other words, the DRX cycle parameter defines a period between when the UE is required to monitor for signalling messages (which in the case of monitoring the HS-SCCH is referred to as the HS-SCCH window). The parameter 'Inactivity Threshold for DRX' indicates the number of subframes of the HS-SCCH or a period the UE is required to monitor following reception of a data packet. Deactivation and consecutive activation of DRX mode is possible based on orders received on HS-SCCH.

As discussed above, in the case of a voice call, the UE of the 'talking' user typically receives SID packets from the UE of the 'listening' user. With CS voice calls using a shared radio channel or radio bearer, such is the case of HSPA, the SID packets are sent on the HS-DSCH and signalling is sent on the control channel, HS-SCCH. Similar methods are applicable for other radio technologies relying on shared radio channels or radio bearers for data transmission and using a control channel for resource allocation, such as Long Term Evolution (LTE).

Figure 3:
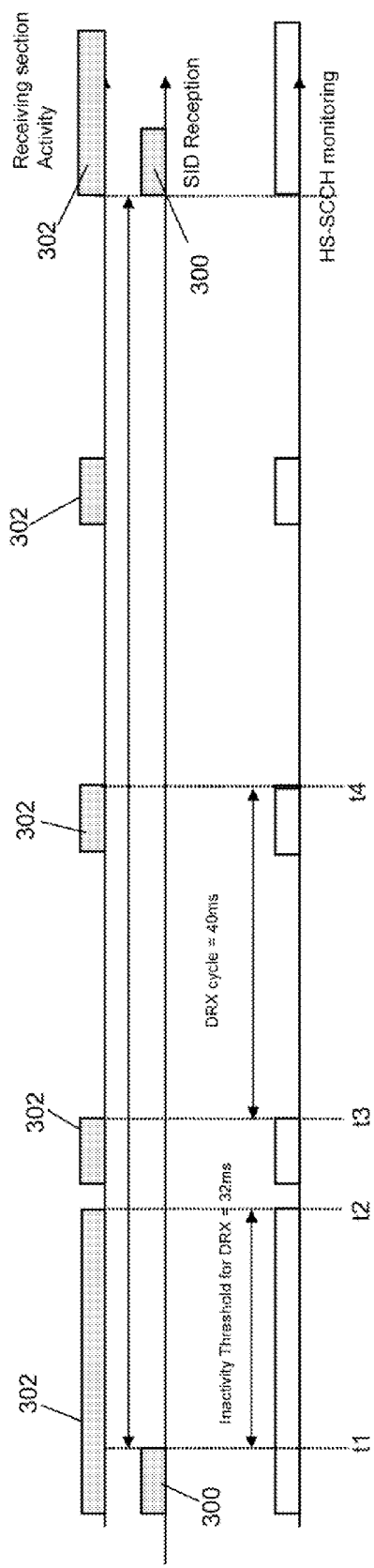
FIG. 3 is a timing diagram showing example activities of a known communication device over time and an example DRX pattern for the communication device when SID packets are received.

Referring now to FIG. 3 which shows, as an example, certain activities of a known UE during a CS voice call over HSPA, whilst the UE transmits voice packets with a periodicity of, for example 40 ms. SID packets 300 are received at the UE with a periodicity of 160 ms over HSUPA. The Inactivity Threshold for DRX parameter is defined as 32 ms (4 subframes) and the DRX cycle parameter is defined as 40 ms (5 subframes). The UE can enter the DRX mode between the SID packets 300 but is required to continuously monitor the control channel, HS-SCCH, during a period, that begins at time t1 when signalling for the UE has been detected on the HS-SCCH for the UE and ends at t2, to see whether any more data packets are scheduled for the UE. This period t1-t2 is defined by the DRX Inactivity Threshold parameter (e.g. 32 ms). If there is no further signalling for the UE detected in the DRX inactivity Threshold period (t1-t2), then the UE follows a DRX cycle or pattern defined by the DRX cycle parameter as shown in FIG. 3. In the example shown in FIG. 3, the DRX cycle is between t1 and t3 and t3 and t4 and is 40 ms. Thus, as shown in FIG. 3, following detection of signalling messages on the control channel HS-SCCH for the SID packet 300, the receiving section of the UE is required to remain active (as shown by blocks 302) and monitor the control channel HS-SCCH for 32 ms before stopping monitoring of the control channel.

When the UE is scheduled a packet during a DRX cycle while monitoring HS-SCCH, it continues to monitor HS-SCCH again for 'Inactivity Threshold for DRX' subframes before entering the normal DRX mode.

By limiting the number of subframes to be monitored by the UE, the battery consumption of the UE can be reduced using the DRX mode. However, as discussed above, upon reception of a SID packet, the UE is required to monitor the control channel HS-SCCH for the Inactivity Threshold for DRX irrespective of what other services the UE is receiving or is involved in.

In order to reduce battery consumption further, a method in accordance with an embodiment of the disclosure selects to not monitor or stop monitoring a control channel once the SID packet has been detected.

Figure 5:
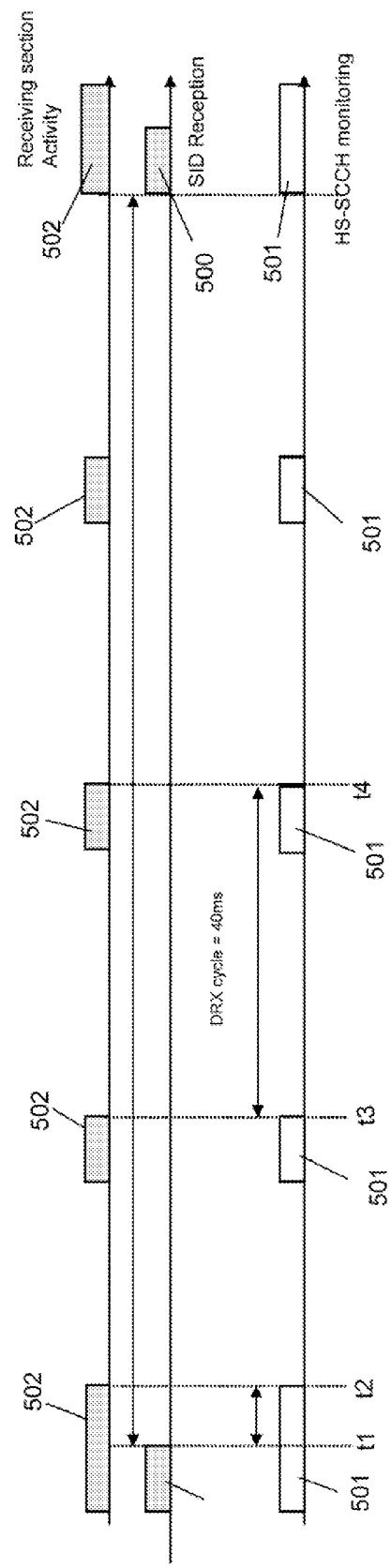
FIG. 5 is a timing diagram showing example activities of the communication device of FIG. 2 over time and an example DRX pattern for the communication device when SID packets are received.
Figure 4:
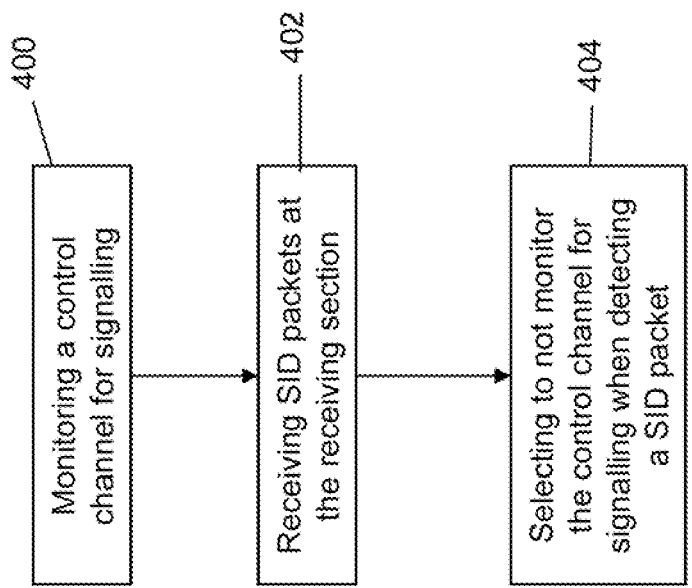
FIG. 4 is a flow diagram showing an example method in accordance with an embodiment of the disclosure in the communication device of FIG. 2.

An example method in a UE (such as UE 200) providing circuit switch, CS, voice services over a packet access radio interface in accordance with an embodiment of the disclosure will now be described with further reference to FIGS. 4 and 5. FIG. 5 shows, certain activities of a UE during a CS voice call over HSPA, whilst the UE transmits voice packets in accordance with an example of an embodiment of the disclosure. Similarly to the arrangement shown in FIG. 3, for the example shown in FIG. 5, the periodicity for the SID packets is 160 ms, which is greater than the periodicity for the voice packets, and the DRX cycle is 40 ms. In the example embodiment, the UE 200 has one radio bearer or radio channel or communication link configured for CS over HSPA. In other words, one radio bearer is used to communicate data packets of two different types having different periodicities: the voice packets and the SID packets. The periodicity of a type of data packet is the time between successive transmissions of a data packet of the same type.

The example method comprises monitoring (step 400) a control channel, such as HS-SCCH, for signalling messages for data packets for the UE 200. The monitoring may be performed by elements of the receiving section 206 of the UE 200 operating in a signalling monitoring mode under the control of the signalling monitoring element 216. The elements involved typically include the receiver, demodulator and decoder. The activity of the receiving section 206 for monitoring the control channel, e.g. HS-SCCH, is shown by the blocks 502 in FIG. 5. Blocks 501 represent HS-SCCH windows during each of which the UE 200 is in a signalling monitoring mode and is arranged to monitor the control channel HS-SCCH for signalling messages for the UE 200. The timing of the HS-SCCH windows 501 is defined by the DRX mode.

When signalling on the HS-SCCH is detected for the UE 200 in a HS-SCCH window 501, the signalling processing element 218 processes the signalling messages. From processing the received signalling messages, the signalling processing element 218 can determine, for example, timing and coding information to enable the UE 200 to successfully receive, decode and detect data (e.g. the SID packet) on the HS-DSCH.

SID packets, such as packets 500 in FIG. 5, are received at the receiving section when the communication device is transmitting circuit switch voice packets, step 402. After detecting signalling messages for a SID packet for the UE 200 in a HS-SCCH window 501, the packet detector element 217 records the time when the packet associated with the signalling is received at the UE (time t1 in FIG. 5), for example is received at the antenna 208 of the UE 200. The packet detector element 217 may alternatively start a timer in order to time a period from t1.

At step 404, the UE 200 selects to not monitor the control channel for signalling messages for a period of time in response to detecting a SID packet received at the UE (e.g. when a SID packet is detected). The period of time starts at t2 in FIG. 5 and ends at t3 and the period t2 to t3 is defined by a parameter of the DRX mode. For example, the period t2 to t3 may depend on the DRX cycle parameter and the monitoring of the control channel may begin again at the next HS-SCCH window 501 defined by the DRX cycle or pattern (that is, at t3 with the period t1 to t3 corresponding to the DRX cycle). In other words, by selecting to not monitor the control channel for signalling messages, the UE 200 may ignore the Inactivity Threshold for DRX parameter.

In an example arrangement, the packet detector element 217 is arranged to detect the SID packet and the processing unit 202 selects not to monitor the control channel, HS-SCCH, for signalling messages when the packet detector element 217 detects a SID packet. The period for detecting a SID packet is between t1 and t2 and the packet detector element 217 may take for example up to 5 ms to detect the SID packet. When a SID packet is detected, the UE 200 (e.g. the processing unit 202) may be arranged to switch the elements of the receiving section 206 to a non-signalling monitoring mode for a period of time (e.g. between t2 and t3), wherein during the non-signalling monitoring mode the elements are arranged to not monitor the control channel for signalling messages. In an example arrangement, this may include powering off at least some of the elements. For example, part of the demodulator and decoder for the control channel, HS-SCCH, of the receiving section 206 may be powered off. When no transmissions are scheduled concurrently, in addition, the receiver may be powered off.

For voice services, it is unlikely that other data packets will be sent to the UE following detection of signalling messages on the control channel, HS-SCCH, for the SID packet and before the SID packet is detected.

However, in an example arrangement, the UE 200 may select to not monitor the control channel, HS-SCCH, when a SID packet has been detected and when no other signalling has been detected on the control channel, HS-SCCH, since the subframe which carried the SID packet. In other words, in the case when a SID packet is received at the UE and other signalling messages for a data packet for the UE 200 is received on the control channel, e.g. HS-SCCH, before the SID packet is detected by the UE 200, the UE 200 may disable the switching of the elements of the receiving section 206 to the non-signalling monitoring mode in response to detecting the other signalling messages and will continue normal DRX operation. This may occur when messages such as Radio Resource Control (RRC) messages and Non-Access Stratum (NAS) messages, which have high priority compared to the SID packet, are sent on the HS-DSCH just before (in the same HS-SCCH window) or at the same time (e.g. multiplexed with the SID data) or just after the SID packet. If such a message is sent by the network 102 up to 5 ms following the SID packet, the UE 200 will detect the signalling messages on the HS-SCCH for the message before the SID packet is detected (e.g. in the case when it takes 5 ms to detect the SID packet) and will then continue normal DRX operation. In other words, the UE 200 will continue to monitor the control channel for the Inactivity Threshold for DRX period. This aspect reduces the chances of missing RRC or NAS signalling.

If the network 102 wants to send NAS or RRC messages after a SID packet has been detected and before the end of a DRX cycle and the next HS-SCCH window 501, the UE 200 will may miss the initial transmission. However, these NAS or RRC messages will be retransmitted (since the network will not have received any HARQ ACK) in the next HS-SCCH window 501 of the DRX cycle and so will be received and detected by the UE in the next HS-SCCH window 501.

Handover commands are usually triggered by UE measurement reports. So when the UE 200 sends a measurement report to the network 102 which indicates poor link quality, the UE 200 may be arranged to disable the switching of the elements of the receiving section 206 to the non-signalling monitoring mode when a SID packet is received so that normal DRX operation is followed (e.g. including monitoring the control channel for the Inactivity Threshold for DRX subframes).

In summary, the method in accordance with an embodiment of the disclosure selects to not monitor a control channel for 'Inactivity Threshold for DRX' when a SID packet is detected. By stopping the monitoring of the control channel as soon as a SID packet is detected, the activity of the receiving section 206 can be reduced and therefore battery consumption reduced compared to the current arrangements which require the UE to continue to monitor the control channel for the Inactivity Threshold for DRX. Thus, current drain of the 3G voice call over HSPA when the user is talking can be reduced.

In a case where the DRX cycle parameter is 40 ms, the Inactivity Threshold for DRX parameter is 32 ms and the processing in the UE requires 5 ms to detect a SID packet, the method in accordance with the disclosure may save 15 mA during talk activity and 10 mA in a typical voice call.

In the foregoing specification, the invention has been described with reference to specific examples of embodiments of the invention. It will, however, be evident that various modifications and changes may be made therein without departing from the broader scope of the invention as set forth in the appended claims.

Some of the above embodiments, as applicable, may be implemented using a variety of different processing systems. For example, the Figures and the discussion thereof describe an exemplary architecture and method which is presented merely to provide a useful reference in discussing various aspects of the disclosure. Of course, the description of the architecture and method has been simplified for purposes of discussion, and it is just one of many different types of appropriate architectures and methods that may be used in accordance with the disclosure. Those skilled in the art will recognize that the boundaries between program elements are merely illustrative and that alternative embodiments may merge elements or impose an alternate decomposition of functionality upon various elements.

The invention claimed is:

1. A method in a communication device providing data services over a packet access radio interface, the method comprising:
   monitoring a control channel for signalling messages for data packets for the communication device;
   receiving data packets for a data service of a first type with a first periodicity;
   receiving data packets for the data service of a second type with a second periodicity, the second periodicity being greater than the first periodicity; and
   selecting at the communication device to stop monitoring the control channel for signalling messages for a period of time in response to detecting by the communication device a data packet of the second type received by the communication device;
   wherein monitoring a control channel comprises monitoring a control channel by elements of a receiving section of the communication device operating in a signalling monitoring mode and wherein selecting comprises switching the elements of the receiving section to a non-signalling monitoring mode for the period of time in response to detecting the data packet of the second type, wherein during the non-signalling monitoring mode the elements are arranged to not monitor the control channel for signalling messages.

2. The method of claim 1, wherein the data packets of the first type include voice data packets.

3. The method of claim 2, wherein the data packets of the second type include Silence Insertion Descriptor packets.

4. The method of claim 1, wherein switching to a non-signalling monitoring mode includes powering off at least some of the elements.

5. The method of claim 1, wherein the communication device is arranged to provide data services with Discontinuous Transmission and Reception modes enabled and wherein the period of time is defined by a parameter of the Discontinuous Reception, DRX, mode.

6. The method of claim 1, wherein the communication device provides data services over one radio bearer.

7. A method in a communication device providing circuit switch, CS, voice services over a packet access radio interface, the method comprising:
   monitoring a control channel for signalling messages for voice data packets for the communication device;
   receiving Silence Insertion Descriptor, SID, packets at the communication device; and
   selecting to not monitor the control channel for signalling messages for a period of time in response to detecting a SID packet received at the communication device;
   wherein monitoring a control channel comprises monitoring a control channel by elements of a receiving section of the communication device operating in a signalling monitoring mode and wherein selecting comprises switching the elements of the receiving section to a non-signalling monitoring mode for the period of time in response to detecting a SID packet, wherein during the non-signalling monitoring mode the elements are arranged to not monitor the control channel for signalling messages.

8. A method in a communication device providing data services over a packet access radio interface, the method comprising:
   monitoring a control channel for signalling messages for data packets for the communication device;
   receiving data packets for a data service of a first type with a first periodicity;
   receiving data packets for the data service of a second type with a second periodicity, the second periodicity being greater than the first periodicity; and
   selecting at the communication device to stop monitoring the control channel for signalling messages for a period of time in response to detecting by the communication device a data packet of the second type received by the communication device;
   wherein the communication device is arranged to provide data services with Discontinuous Transmission and Reception modes enabled, wherein the method further comprises receiving configuration information for an inactivity threshold for Discontinuous Reception, DRX, parameter, and wherein selecting to not monitor the control channel for signalling messages further comprises selecting to ignore the inactivity threshold parameter for DRX.

9. A method in a communication device providing data services over a packet access radio interface, the method comprising:
   monitoring a control channel for signalling messages for data packets for the communication device;
   receiving data packets for a data service of a first type with a first periodicity;
   receiving data packets for the data service of a second type with a second periodicity, the second periodicity being greater than the first periodicity; and
   selecting at the communication device to stop monitoring the control channel for signalling messages for a period of time in response to detecting by the communication device a data packet of the second type received by the communication device;
   wherein the data packets of the first type include voice data packets;
   wherein the data packets of the second type include Silence Insertion Descriptor packets; and
   wherein monitoring comprises monitoring a control channel for signalling messages for data packets for the communication device during a signalling monitoring window and the method further comprises:
   detecting signalling messages for the communication device in the same signalling monitoring window as a received SID packet but before the SID packet is detected; and
   disabling the switching of the elements of the receiving section to the non-signalling monitoring mode in response to detecting signalling messages.

10. The method of claim 9, wherein the packet access radio interface is a High Speed Packet Access, HSPA, radio interface.

11. A communication device for providing data services over a packet access radio interface, the communication device comprising:
   a receiving section for monitoring a control channel for signalling messages for data packets for the communication device, for receiving data packets for a data service of a first type with a first periodicity and for receiving data packets for the data service of a second type with a second periodicity, the second periodicity being greater than the first periodicity; and
   a processing unit for selecting to stop monitoring the control channel for signalling messages for a period of time in response to detecting by the communication device a data packet of the second type received by the communication device;
   wherein the receiving section comprises elements for monitoring a control channel for signalling messages in a signalling monitoring mode and wherein the processing unit is arranged to switch the elements of the receiving section to a non-signalling monitoring mode for the period of time in response to detecting a data packet of the second type or a SID packet, wherein during the non-signalling monitoring mode the elements are arranged to not monitor the control channel for signalling messages.

12. The communication device of claim 11, wherein the communication device is arranged to provide circuit switch, CS, voice services over a packet access radio interface, and wherein the data packets of the first type include voice data packets and wherein the data packets of the second type include Silence Insertion Descriptor packets.

* * * * *